United States Patent [19]

Cusick et al.

[11] Patent Number: 5,208,583
[45] Date of Patent: May 4, 1993

[54] ACCELERATED PIXEL DATA MOVEMENT

[75] Inventors: Daniel V. Cusick, Chesterland; John E. Conroy, Hudson; Raymond G. Molnar, Boston Heights, all of Ohio; O. Nolan Daines, Fremont, Calif.

[73] Assignee: Bell & Howell Publication Systems, Company, Wooster, Ohio

[21] Appl. No.: 594,384

[22] Filed: Oct. 9, 1990

Related U.S. Application Data

[63] Continuation-in-part of Ser. No. 592,186, Oct. 3, 1990, Pat. No. 5,199,101.

[51] Int. Cl.$^5$ ............................................. G09G 1/06
[52] U.S. Cl. ................................. 340/723; 340/724; 340/799
[58] Field of Search ............... 340/723, 724, 799, 798, 340/750, 726, 747

[56] References Cited

U.S. PATENT DOCUMENTS

| | | | |
|---|---|---|---|
| Re. 31,200 | 4/1983 | Sukonick | 340/724 |
| 4,442,495 | 4/1984 | Sukonick | 364/521 |
| 4,549,275 | 10/1985 | Sukonick | 364/521 |
| 4,570,161 | 2/1986 | Kummer et al. | 340/799 |
| 4,581,611 | 4/1986 | Yang et al. | 340/750 |
| 4,587,559 | 5/1986 | Longacre, Jr. et al. | 340/750 |
| 4,602,251 | 7/1986 | Sawada et al. | 340/724 |
| 4,618,858 | 10/1986 | Belch | 340/724 |
| 4,745,407 | 5/1988 | Costello | 340/799 |
| 4,779,084 | 10/1988 | Tanaka et al. | 340/724 |
| 4,808,986 | 2/1989 | Mansfield et al. | 340/747 |
| 4,818,979 | 4/1989 | Manson | 340/747 |
| 4,851,834 | 7/1989 | Stockebrand et al. | 340/801 |
| 4,922,238 | 5/1990 | Aoki et al. | 340/724 |
| 4,954,819 | 9/1990 | Watkins | 340/799 |

Primary Examiner—Jeffery A. Brier
Assistant Examiner—Regina Liang
Attorney, Agent, or Firm—Fay, Sharpe, Beall, Fagan, Minnich & McKee

[57] ABSTRACT

An image having more pixels than can be displayed on a video monitor (16) is stored in an image buffer (10) in packed raster format. During a vertical retrace period, the video monitor generates several horizontal synchronization signals which clock a video memory controller (20). Each time the video memory controller is clocked, it moves a portion of a next successive row of data from the image buffer to a video memory (12). In this manner, several rows of new data are loaded into the video memory before the video monitor starts withdrawing data from the video memory to display the first raster scan line. As the raster scan line is indexed to move down the video image by the horizontal synchronization pulses, the same horizontal synchronization pulses continue to index the row addresses of the video memory controller keeping the transfer of new data into the video memory several lines ahead of the current raster scan line. In a panning mode, the vertical synchronization signal of the video monitor resets the video memory controller to a new initial starting address (26') shifted a small distance, e.g. one pixel from a preceding data transfer start address (26). This causes the next frame which is displayed to be shifted the small amount from the preceding frame. In this manner, the image is panned smoothly without perceivable flicker.

20 Claims, 2 Drawing Sheets

ACCELERATED PIXEL DATA MOVEMENT

BACKGROUND OF THE INVENTION

This application is a continuation-in-part of application Ser. No. 07/592,186 U.S. Pat. No. 5,199,101 entitled "On the Fly Image Rotation System for High-Speed Printers" filed Oct. 3, 1990.

The present invention relates to the video image display arts. It finds particular application in conjunction with displaying only a portion of an image or a video monitor and panning or moving the portion of the image which is displayed and will be described with particular reference thereto. It will be appreciated, however, that the invention may also find application with the rapid display or changing of the display of images in windows or viewports, in paging and scrolling text displays, and the like.

Heretofore, a portion of a large image to be displayed on a video monitor has been moved from a main memory area into a smaller video or image memory buffer. Typically, the time required for moving a complete frame of video data into the video memory buffer was long compared with the refresh time for a video monitor. To accommodate scrolling or panning of the displayed portion of the data, the video buffer memory was enlarged. During scrolling and panning, the data in the video buffer memory was physically shifted to different memory cells or the access memory addresses shifted. Only new data in the direction of movement was moved into the video memory replacing the most remote image data in the opposite direction. See, for example, U.S. Pat. Nos. 4,808,986; 4,602,251; 4,570,161; 4,549,275; and 4,442,495.

In prior panning and scrolling techniques, the display transition lacked smoothness. The image appeared to jump, move in steps, or otherwise move in a manner that is difficult for the human eye to follow, particularly when panning or scrolling at a high rate of speed.

The present invention contemplates a new and improved image pixel data handling technique and achieves a smooth panning movement.

SUMMARY OF THE INVENTION

In accordance with the present invention, a control means controls the transfer of data between an image buffer and a video memory at a rate which enables an entire frame of data to be transferred within the vertical refresh time of a video monitor.

In accordance with a more specific aspect of the present invention, an image data handling system is provided for providing data to a video monitor whose raster movement is controlled by video raster control signals, e.g. horizontal and vertical synchronization signals. An image buffer means stores bits of data indicative of pixel values of an image which has more pixels than the video monitor displays. A video random access memory means stores a portion of the image data. The video memory means is connected with the video monitor to provide video data thereto and is connected with the image buffer means for receiving video data therefrom. A video memory control means selectively causes portions of rows of video data to be transferred from the image buffer means to the video memory means. The video memory control means is operatively connected with the video monitor and synchronized to the video raster control signals. The video memory control means is synchronized with the horizontal raster sweeps to coordinate the transfer of a portion of the next image data row from the image buffer means to the video memory means with the raster movement.

In accordance with another aspect of the present invention, a video data handling system is provided. A video memory into which and out of which data is concurrently read has a plurality of planes of memory elements or cells. Each plane of memory elements is defined by row and column coordinates. A raster control means generates raster control signals for controlling raster movement in a video monitor. A data packing control means channels plural bits corresponding to common pixels in a stream of packed data to memory elements with corresponding row and column coordinates in a corresponding plurality of the memory planes. In this manner, in each pixel that is described by a preselected plurality of bits, the bits of like significance are stored in corresponding, preselected memory planes at a corresponding address in each plane. A video memory control means causes a stream of the packed data which corresponds to one row of memory plane coordinates to be read into the video memory each time another row of data is read out of the video memory to the video monitor.

In accordance with another aspect of the present invention, a method is provided for transferring video image data to a video monitor whose raster movement is controlled by raster control signals. Bits of data representing pixels of an image having more pixels than are displayed on the video monitor are stored in rows and columns of an image memory. In coordination with the raster control signals, (1) a portion of a row of data is read from the image memory into a video memory and concurrently (2) a portion of a different row of data is read from the video memory to the video monitor.

In accordance with another more specific aspect of the present invention, a method is provided of panning a video display that is stored electronically in a video memory and displayed on a video monitor whose raster movement is controlled by horizontal and vertical raster control signals. (a) A starting row and column address of an image is designated. (b) In coordination with a first horizontal control signal, a row portion commencing at the starting address is transferred to the video memory and the row address is indexed. (c) In coordination with a subsequent horizontal control signal, a row portion with the indexed row address is transferred to the video monitor and the row address is indexed. (d) Step (c) is repeated a plurality of times. (e) When the transfer of a frame of data is completed, the starting address is indexed and steps (b)-(d) are repeated. By indexing the starting address by small pixel increments, the video display pans across the image.

A primary advantage of the present invention is that it provides for a virtual, continuous panning or image movement.

Another advantage of the present invention is that it enables displays and windows to be changed apparently instantaneously, more specifically within a vertical refresh time of a video display.

Another advantage of the present invention is that it enables data to be stored compactly in packed format and enables text and images with the same or different numbers of bits per pixel to be selectively intermixed or superimposed.

Still further advantages of the present invention will become apparent to those of ordinary skill in the art upon reading and understanding the following detailed description.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
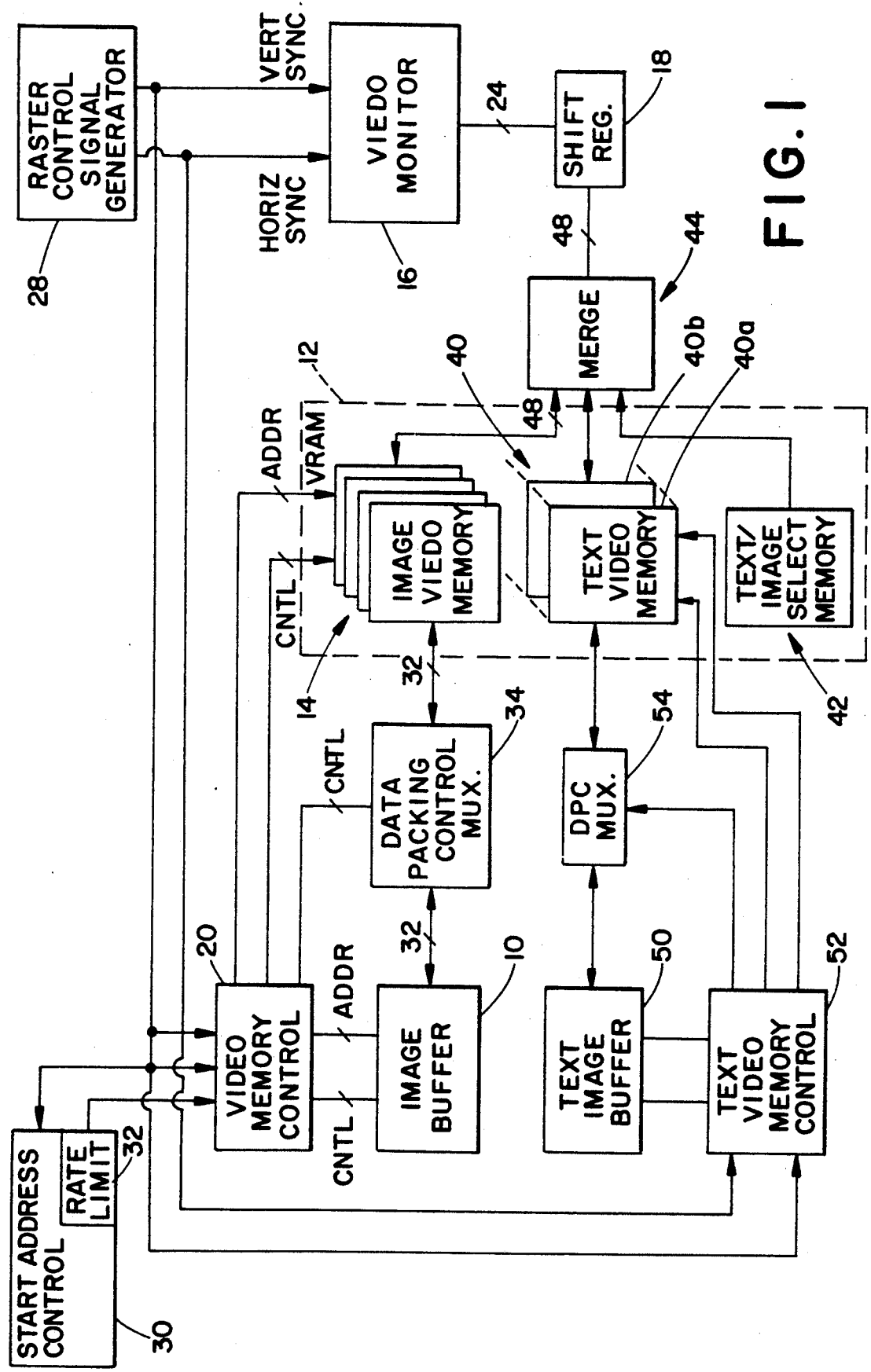
FIG. 1 is a diagrammatic illustration of an image data processing system in accordance with the present invention.

With reference to FIG. 1, a large image, such as a B or C size drawing with 300 pixels per inch is stored in an image buffer 10 in packed format. The image is stored with a selectable number of bits per pixel. That is, an image in which each pixel can only be black or white is described with one bit per pixel. A gray scale image that has four gray levels requires two bits per pixel, and so on for larger numbers of bits per pixel. Analogously, each pixel may have one or more bits to indicate hue, one or more bits to indicate saturation, and one or more bits to indicate intensity. In the preferred embodiment, the image buffer is a random access memory, such as a DRAM, SRAM, or the like, of appropriate capacity to store all the pixels of a selected image size and the selected number of bits per pixel.

A VRAM or video random access memory 12 enables data to be written in through one port and read out through a second port concurrently. This is distinguished from a DRAM which cannot accommodate the concurrent reading and writing of data. The video memory has a three dimensional array of memory elements which are conveniently conceptualized as a plurality of parallel planar matrices 14. The number of matrices or planes correspond to a maximum number of bits per pixel. Each matrix is conveniently described in terms of row and column coordinates. The number of rows corresponds to the number of raster lines of a video monitor 16 on which a portion of the image is to be displayed. The rows are divided into a number of columns which correspond in number to the number of pixels on each raster line of the video monitor or the portion of the monitor on which the image is to be displayed. In this manner, each video memory plane 14 is smaller than the image buffer 10 to hold only the portion of the image which is actually displayed on the monitor.

Data is clocked from the video memory planes 14 to a data transfer speed adjusting means 18 which increases the speed of data transfer from the clocking rate of the video memory 12 to match the scan rate of the video monitor 16. The speed adjusting means includes shift registers into which data is clocked at the VRAM clock rate and out of which data is clocked at the video monitor clock rate.

Figure 2:
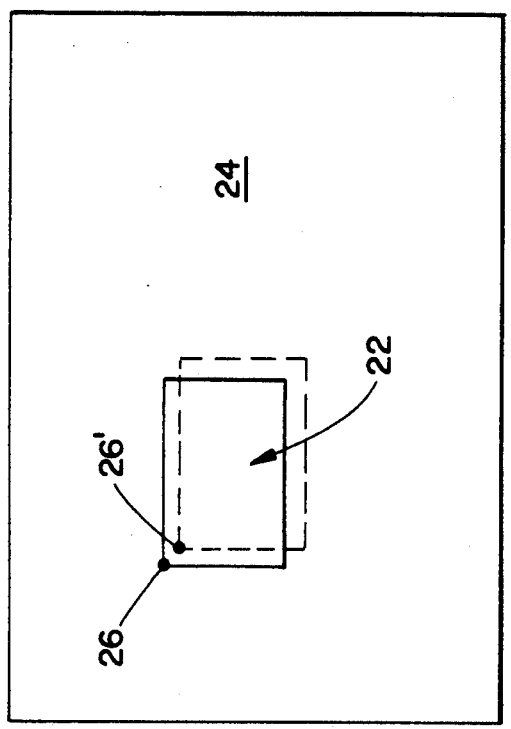
FIG. 2 is a diagrammatic illustration to assist in conceptualizing the movement of data during panning; and, FIGS. 3A, 3B, and 3C illustrate the organization of the video memory when storing 4 bit, 1 bit and 2 bit per pixel image data, respectively.

With continuing reference to FIG. 1 and further reference to FIG. 2, a video memory controller 20 receives an identification of a window or portion 22 of an image 24 in the image buffer 10 which is to be transferred to the video memory 12. In the preferred embodiment, the window identification includes a start address 26 which designates a first row or line of image data to be transferred and where in the row or line the transfer is to start. The identification further includes an indication of the length of the row or line to be moved, an indication of the number of lines to moved, and an offset which is utilized to identify where in the next image row data transfer is to start. It will be noted that because the image data is packed and the number of bits per pixel is selectable, the length of the data transferred will vary with the number of bits per pixel. For simplicity of description, the window 22 is described in the preferred embodiment as being the same size as the video data storage space of the video memory 12. In this manner, the entire video display is panned.

However, it is to be appreciated, that the entire display need not be panned. Rather, only data in one or more portions or video ports of the video memory 12 can be panned. For example, the video memory 12 may include a number of display portions or windows, only one of which is to be panned. In order to accommodate windows that are smaller than the full video memory 12, the video memory controller also receives a starting address in the video memory for the transferred data.

Raster movement of the video monitor 16 is clocked or controlled by video control signals, specifically a series of horizontal synchronization pulses and vertical synchronization pulses from a raster control signal generator 28. Each horizontal synchronization pulse marks the commencement of a horizontal raster scan. During the vertical retrace time, the horizontal synchronization pulses are still generated but are blanked to prevent an actual horizontal raster scan from being initiated. The horizontal synchronization pulses are fed to the video memory controller 20 to coordinate the transfer of lines of image data in a burst transfer mode from the image buffer 10 to the video memory 12 with the raster movement. That is, in response to the first horizontal synchronization pulse, the video memory controller outputs the start row address and strobes the column address with a high-speed strobe signal, the number of strobe pulses corresponding to the line length. This outputs a stream of data which is loaded into the video memory 12 at the designated video memory start address. In response to the second horizontal synchronization pulse, the row address is indexed by one and latched as the column address is strobed the number of times corresponding to the line length. This causes another continuous stream of data to be moved rapidly from the image buffer memory into a corresponding row of the video memory 12. This process is continued until the entire designated image portion is transferred. During panning, a starting address control or changing means 30 changes the start address of the image buffer 12 to a new, displaced starting address 26' in the direction of panning. The video memory starting address stays the same. The vertical retrace signal at the end of each frame synchronizes the video memory controller to begin moving a continuous stream of data commencing with the new starting address from the image buffer to the video memory. The address control means is preferably operator controlled, such as with a joy stick. Preferably, a panning rate limiting means 32 limits the number of pixels which the start address can shift between frames.

During the vertical retrace time, several horizontal synchronization pulses are generated. This enables several rows of the display video data to be transferred as described above from the image buffer 10 to the video memory 12 before the first raster scan of the new frame (or field in an interlaced display mode). Because another line of image data is transferred concurrently with each video monitor raster scan, the updating of the video memory 12 stays several lines ahead of the raster scan of the video monitor. In this manner, all or a selected portion of the data stored in the video memory 12 is replaced in the time necessary for a single vertical refresh of the video monitor.

The video memory control means 20 can be visualized as a row address generator or counter that is stepped with each raster scan and a column address generator or counter that is stepped very rapidly by a strobe clock. A gate which is opened by the horizontal synchronization pulse stays open for a number of strobe cycles corresponding to the designated line length and then resets the column counter. The row address counter is reinitialized after the frame of data has been transferred, e.g. by an end of data signal or the vertical synchronization signal.

As indicated above, the packed data in the image buffer 10 has a selectable number of bits per pixel. The video memory controller 20 adjusts the addresses, i.e. the line length, in accordance with the number of bits per pixel. A data packing control multiplexer means 34 interprets the data for different numbers of bits per pixel analogously to the way that the video memory controller interprets the addresses. For example, if the data is received by the data packing control means in four bit groups and each pixel may be represented by 1, 2, or 4 bits, then the four received bits could indicate the pixel values of 4, 2, or 1 pixels.

Figure 3C:
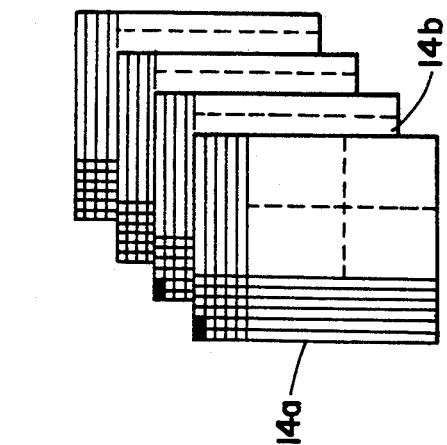
Figure 3B:
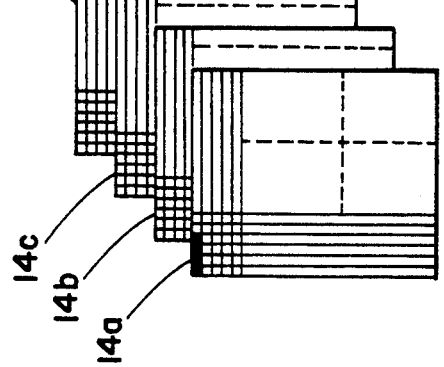
Figure 3A:
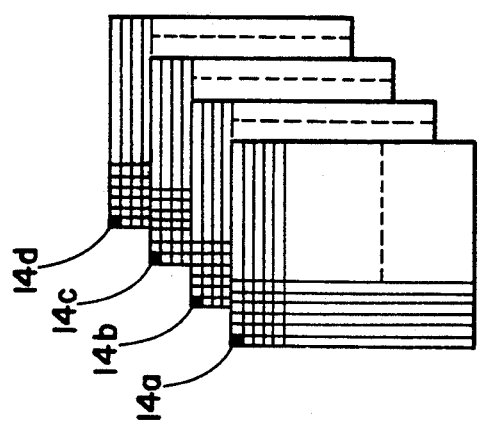

The data packing control means 34 channels the bits of the stream of data between the image buffer and appropriate planes 14 of the video memory 12. With reference to FIG. 3A, when the image data is in a 4 bit per pixel format, the first four bits are channelled to the memory elements at the first row and column at each of four planes 14a, 14b, 14c, 14d. The next four bits of the data stream are channelled to the memory elements at the first row, second column of each plane. With reference to FIG. 3B, when the data is in a 1 bit per pixel format, the first four bits are channelled to the first four columns of the first row of the first video memory plane 14a defining four pixels. The next four bits are channelled to the fifth-eighth columns of the first row. With reference to FIG. 3C, in a 2 bit per pixel format, the first two bits are stored in the first column of the first row of the first and second memory planes 14a and 14b, respectively. The third and fourth bits are stored in the second column of the first row of the first and second planes 14a and 14b, respectively. Of course, additional memory planes may be provided to accommodate other numbers of bits per pixel, e.g. 8, 16, 32, etc.

In accordance with another aspect of the present invention, a text video memory 40 is provided for supplying text to the video monitor. The text video memory includes a plurality of planes 40a, 40b, of matrices analogous to matrices 14a, 14b, . . . . The number of text memory planes corresponds to the number of bits per pixel of text data and can be different in number from the image memory plane. A text/image selection memory means 42 designates on a pixel by pixel basis whether a pixel of data from the image video memory 12 or a pixel of data from the text video memory 40 is to be displayed on the video monitor. In the preferred embodiment, the selection memory has a memory element corresponding to each pixel of the video monitor. Each memory cell is loaded with a designation of which data or combination of data is to be displayed at each pixel of the monitor. The text/image selection memory means 42 controls a merge means 44 that merges or superimposes the image and text data. In the preferred embodiment, the merge means passes either the text bits or the image bits on a pixel by pixel basis. Various other merging or combining operations are contemplated. For example, the corresponding bits can be summed, compared to determine the larger or smaller, subtracted, inverted, ORed, or the like.

It is to be appreciated, that the text and image data need not have the same number of bits per pixel. Rather, the data with the fewer number of bits per pixel is merged with designated bits of the data with more bits per pixel. For example, the image may be designated by a single bit indicating only a black or a white pixel. By contrast, each pixel of the text may be described with two bits such that the text can take on intermediate gray levels. This enables the image in black and white to be superimposed with gray scale text.

Optionally, the text video memory may be connected with a text buffer memory 50 which stores numerous pages or lines of text. A text memory controller 52 and a text data packing control means 54 analogous to controller 20 and packing control means 32 selectively updates or changes the text video memory during vertical refreshes of the video monitor.

In the preferred embodiment, the data path between the image buffer 10 and the video memory 12 is a two-way data path. That is, the operator may change the display by modifying text or graphics in the text video memory 40, which changes become a part of the displayed image. When the display has been adjusted to the operator's satisfaction, the operator enables the video memory control means 20 to transfer the data starting at the designated start address of the video memory 12 back to the image buffer starting at the designated start address 26. In this manner, the operator can make changes on the data in the video memory 12 and, if such changes are satisfactory, reload the changed data back into the image buffer 10.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A video data handling system for providing data to a video monitor having raster movement that is controlled by horizontal and vertical synchronization pulses, the system comprising:
   an image buffer memory means for storing bits of video data indicative of pixels of a large image which has more pixels than are concurrently displayed on the video monitor;
   a video random access memory means for storing rows of video data which are currently displayed on the video monitor, the video random access memory means being connected with the video monitor to provide the rows of video data thereto for display and being connected with the image buffer memory means for being refreshed by video data received from a subregion thereof;

a video memory control means operatively connected with the image buffer memory means and the video random access memory means for refreshing the video random access memory means by selectively causing a plurality of rows of video data to be transferred from the image buffer memory means subregion to the video random access memory means during a vertical retrace period of the video monitor, the plurality of rows transferred during the vertical retrace period being less than all the rows of a displayed video image, the video memory control means causing the transfer of a another video data row from the image buffer memory means subregion to the video random access memory means during horizontal readout of a row of video data from the video random access memory after each horizontal synchronization pulse until all the rows of video data corresponding to the displayed video image are transferred, whereby another row of video data in the video random access memory means is updated with video data from the image buffer memory means subregion with each raster scan of the video monitor.

2. The system as set forth in claim 1 wherein the image buffer memory means stores the video data in a packed raster format and wherein each pixel is describable by a selectable number of bits, the video memory control means adjusting each row of video data transferred in accordance with the number of bits per pixel, the video random access memory means having a plurality of memory planes, each memory plane having a matrix of rows and columns and further including a data packing control means connected between the image buffer memory means and the video random access memory means for channelling bits corresponding to a common pixel to common row and column coordinates of the memory planes.

3. The system as set forth in claim 1 further including:
a second video memory means for storing data indicative of additional information to be displayed; and
a merging means for selectively merging data from the first and second video memory means and for supplying the merged data to the video monitor.

4. The system as set forth in claim 3 further including a second image buffer means for selectively supplying data to the second video memory means.

5. The system as set forth in claim 4 further including a second video memory control means for causing rows of data from the second image buffer means to be transferred to the second video memory means in coordination with the horizontal synchronization pulses.

6. The system as set forth in claim 1 further including a means for changing of a starting address of the subregion from which data is transferred from the image buffer memory means to the video random access memory means in coordination with the vertical synchronization pulse.

7. A method of providing video image data to a video monitor having a raster scan controlled by horizontal and vertical raster sync pulses, the method comprising:
in rows and columns of an image memory, storing bits of data representing pixels of an image having more pixels than displayed on a screen of the video monitor;

in response to each of a plurality of the horizontal sync pulses, concurrently (1) transferring a portion of an image memory row of image data from the image memory to and filling a video memory row of a video memory as (2) a previously filled different horizontal video memory row of data is read out from the video memory to the video monitor which different horizontal video memory row was filled after a display of a next preceding frame on the video monitor.

8. The method as set forth in claim 7 wherein after each image memory portion is transferred from the image memory, a starting address of the transferred image memory row portion is indexed, such that in response to a subsequent horizontal sync pulse, the data from the indexed image memory row portion is transferred.

9. The method as set forth in claim 8 wherein in coordination with the vertical sync pulse, the image memory row and column addresses are initialized to the indexed starting image memory row and column addresses, a starting row and column address of the video memory remaining fixed.

10. The method as set forth in claim 9 wherein the starting image memory row and column addresses are indexed to addresses of an adjacent pixel in coordination with subsequent vertical sync pulses, such that the displayed image is panned.

11. The method as set forth in claim 10 wherein a plurality of horizontal sync pulses are generated after the vertical sync pulse during a vertical retrace such that a plurality of image memory row portions of image data are transferred from the image memory to fill corresponding video memory rows of the video memory before the video monitor scans a first raster line of a subsequent frame, whereby the data transfer stays the plurality of rows ahead of the raster scan of the video monitor.

12. The method as set forth in claim 9 wherein in the step of storing the image data in the image memory, the data is stored in packed raster format with one of a selectable number of bits per pixel and further including as each image memory row portion of bits is transferred to the video memory, identifying the bits corresponding to each pixel.

13. The method as set forth in claim 12 wherein the video memory includes a plurality of planes of memory elements, each memory plane organized in a matrix of rows and columns of memory elements, and wherein the step of transferring each image memory row portion of bits includes storing bits corresponding to each common pixel in memory elements having common row and column coordinates of each memory plane, with each memory plane storing bits of like significance.

14. The method as set forth in claim 13 wherein the video memory planes include image memory planes in which the bits of the image data are stored and a text memory plane and further including:
storing bits of text data to be displayed on the video monitor the text memory plane of the video memory; and
merging the bits of image and text data from the text and image memory planes for display on the video monitor.

15. The method as set forth in claim 14 wherein the data stored in the text and image memory planes have different numbers of bits per pixel.

16. The method as set forth in claim 12 further including storing text data in a text buffer and transferring a line of text data from the text buffer to the video memory in coordination with each horizontal sync pulse.

17. A method of panning a video display of a displayed portion of a larger image around the larger image which larger image is stored electronically in an image memory and which displayed portion is displayed on a video monitor, the method comprising:

a) designating starting image memory row and column addresses within the larger image;

b) in coordination with a horizontal raster control signal for controlling horizontal readout of a row of video data from a video memory to the video monitor, transferring during the horizontal read out image values along a row portion commencing at the starting row and column addresses from the image memory to memory elements of a starting memory element row of the video memory which video memory has a plurality of rows of video memory elements, the number of video memory rows corresponding to a number of raster lines in the video display and each video memory row having a number of memory elements corresponding to a number of pixels along each raster line of the video display and increasing the starting image memory row address;

c) in coordination with a subsequent horizontal raster control signal, transferring during a corresponding horizontal readout image values from the image memory along an image memory row portion commencing with the indexed image memory row address and the starting column address to video memory elements of a next row of the video memory and indexing the indexed image memory row address and concurrently transferring image values from video memory elements of a preceding row of the video memory to the video monitor to form one line of the video display;

d) repeating step (c) a plurality of times;

e) after image values have been transferred into video memory elements of a last row of the video memory, indexing the image memory starting addresses and repeating steps (b)-(d) such that the video display pans across the image.

18. The method as set forth in claim 17 wherein steps (b) and (c) are performed at least in part during a vertical retrace period.

19. A method of handling video data movement through a video memory that has a plurality of memory planes, each memory plane being defined by a matrix of memory elements identified by row and column coordinates, the method comprising:

conveying a stream of bits of packed data in which a preselected plurality of bits corresponds to each pixel of a video monitor;

channelling bits of like significance corresponding to each pixel to corresponding row and column coordinates in a corresponding ones of the memory planes;

during a vertical retrace of the video monitor, storing the bits channeled to the memory planes in at least an earliest displayed row of the memory plane;

concurrently (i) horizontally reading out the bits from an earlier displayed row of the memory planes to the video monitor and (ii) storing the bits channelled to a later displayed row of the memory planes such that the bits are read from the memory planes to the video monitor for display a fraction of a frame after being read into the memory planes;

repeating the concurrent reading and storing until the bits channelled to the memory planes are stored in a last displayed row;

repeating the reading until the bits from the last displayed row are read to the video monitor.

20. A video panning system comprising:

a video monitor having raster movement that is controlled by horizontal and vertical synchronization pulses to generate a video display having a grid of pixels defined by a selected number of pixel rows and a selected number of pixel columns;

a video random access memory means including a number of memory elements defined by a selected number of memory element rows and a selected number of memory element columns, the selected number of memory element rows being the same as the preselected number of video pixel rows and the selected number of memory element columns being the same as the selected number of video pixel columns, the video random access memory being connected with the video monitor such that rows of data are successively read therefrom to the video monitor to generate corresponding rows of pixels of the video display, the video random access memory having a plurality of planes of the memory cells, each with said selected number of memory element rows and columns, corresponding memory elements of each plane storing bits of a corresponding video data value, each plane storing bits of like significance;

an image buffer memory means having a multiplicity of memory elements which is substantially larger than the number of memory elements of the video random access memory, the image buffer memory means memory elements storing image data values for each of a multiplicity of pixels which exceeds the number of pixels which are displayable at one time on the video monitor;

a video memory control means for selectively causing rows of memory elements of a subregion of the image buffer memory means to be transferred to corresponding rows of the video random access memory, the subregion having substantially the same number of rows and columns of memory elements as the number of rows and columns of memory elements of the video random access memory means, the video memory control means causing a row of data values to be transferred from the image buffer memory means subregion to the video random access memory in response to each horizontal synchronization pulse such that a row of memory elements of the video random access memory means is updated with memory values from the image buffer memory means concurrently as another row of video data values is read out from the video random access memory to the video monitor responsive to each horizontal synchronization pulse;

a means for indexing a starting address of the image buffer memory means subregion in response to a vertical synchronization pulse such that the image buffer memory means subregion is indexed and image data values from an indexed subregion row of memory elements updates the video random access memory means row in response to each subsequent horizontal synchronization pulse.

* * * * *